(12) United States Patent
Goto et al.

(10) Patent No.: US 8,284,013 B2
(45) Date of Patent: *Oct. 9, 2012

(54) SEMICONDUCTOR CERAMIC AND POSITIVE TEMPERATURE COEFFICIENT THERMISTOR

(75) Inventors: Masato Goto, Nagaokakyo (JP); Hayato Katsu, Nagaokakyo (JP); Naoaki Abe, Nagaokakyo (JP); Atsushi Kishimoto, Nagaokakyo (JP); Akinori Nakayama, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/111,085

(22) Filed: May 19, 2011

(65) Prior Publication Data

US 2011/0215895 A1 Sep. 8, 2011

Related U.S. Application Data

(63) Continuation of application No. PCT/JP2009/070758, filed on Dec. 11, 2009.

(30) Foreign Application Priority Data

Dec. 12, 2008 (JP) ................................. 2008-317474

(51) Int. Cl.
*H01C 7/10* (2006.01)
(52) U.S. Cl. .................. 338/22 SD; 338/22 R; 338/223; 338/320; 252/511; 428/325
(58) Field of Classification Search ................ 338/22 R, 338/24, 320, 223, 224; 252/500, 511–514; 428/404, 325, 328, 331; 501/134, 123
See application file for complete search history.

(56) References Cited

U.S. PATENT DOCUMENTS

| | | | | |
|---|---|---|---|---|
| 4,956,320 A | * | 9/1990 | Asakura et al. | 501/137 |
| 5,414,403 A | * | 5/1995 | Greuter et al. | 338/22 R |
| 5,814,849 A | * | 9/1998 | Azuma et al. | 257/295 |
| 6,221,800 B1 | * | 4/2001 | Takahashi et al. | 501/137 |
| 6,542,067 B1 | * | 4/2003 | Kawamoto | 338/22 R |

(Continued)

FOREIGN PATENT DOCUMENTS

JP 56-169301 A 12/1981

(Continued)

OTHER PUBLICATIONS

Written Opinion of the International Searching Authority, mailed Feb. 16, 2010.

(Continued)

*Primary Examiner* — Kyung Lee
(74) *Attorney, Agent, or Firm* — Dickstein Shapiro LLP

(57) ABSTRACT

A semiconductor ceramic includes a $Ba_mTiO_3$-based composition, as a main component, having a perovskite structure represented by general formula $A_mBO_3$. Part of Ba constituting an A site is replaced with at least an alkali metal element, Bi, and a rare-earth element, and the molar ratio m between the A site and a B site is $0.990 \leq m \leq 0.999$ (preferably $0.990 \leq m \leq 0.995$). Preferably, part of the Ba is replaced with Ca, and the content of the Ca when the total number of moles of the elements constituting the A site is 1 mole is 0.042 to 0.20 (preferably 0.125 to 0.175) on a molar basis. A PTC thermistor includes a component body formed of the semiconductor ceramic. Accordingly, there are provided satisfactory rise characteristics even if an alkali metal element is present.

20 Claims, 1 Drawing Sheet

U.S. PATENT DOCUMENTS

| | | | |
|---|---|---|---|
| 7,764,161 B2 | 7/2010 | Katsu et al. | |
| 8,093,170 B2 * | 1/2012 | Katsu | 501/134 |
| 2009/0201121 A1 | 8/2009 | Katsu et al. | |

FOREIGN PATENT DOCUMENTS

| | | | |
|---|---|---|---|
| JP | 05-275203 A | | 10/1993 |
| JP | 10152372 | * | 6/1998 |
| JP | 2005-255493 | * | 9/2005 |
| JP | 2005-255493 A | | 9/2005 |
| WO | WO-2008-038538 A1 | | 4/2008 |

OTHER PUBLICATIONS

Blanchart, P., Balestrieri, D., Weber, F., and Abelard, P., "Influence of Calcium Addition on the Microstructure and the Electrical Properties at Room Temperature of $BaTiOC_3$ for PTC Thermistors," Silicates Industriels, 1994, vol. 59 (1-2), pp. 47-52.

* cited by examiner

SEMICONDUCTOR CERAMIC AND POSITIVE TEMPERATURE COEFFICIENT THERMISTOR

This is a continuation of application Serial No. PCT/JP2009/070759, filed Dec. 11, 2009, the entire contents of which is incorporated herein by reference.

TECHNICAL FIELD

The present invention relates to a semiconductor ceramic and a positive temperature coefficient thermistor, and specifically to a semiconductor ceramic having a positive temperature coefficient (hereinafter referred to as "PTC characteristic") and a positive temperature coefficient thermistor (hereinafter referred to as "PTC thermistor") used for a heater or the like.

BACKGROUND ART

A barium titanate ($BaTiO_3$)-based semiconductor ceramic generates heat upon the application of a voltage and has PTC characteristics in which the resistance value rapidly increases when the temperature exceeds the Curie temperature Tc at which a phase transition takes place from a tetragonal crystal to a cubic crystal.

In such a semiconductor ceramic having PTC characteristics, the resistance value increases when the temperature exceeds the Curie temperature Tc because of the generation of heat caused by the application of a voltage. As a result, a current does not easily flow and the temperature decreases. When the temperature is decreased and thus the resistance value is decreased, a current easily flows again and the temperature is increased. By repeating the above-described process, the temperature or current is caused to converge to a certain temperature or current in such a semiconductor ceramic. Therefore, such a semiconductor ceramic is widely used as a thermistor for a heater or a motor starting device.

Since a PTC thermistor used for a heater or the like is used at high temperature, the Curie temperature Tc is required to be high. Therefore, the Curie temperature Tc has been conventionally increased by replacing part of Ba of $BaTiO_3$ with Pb.

However, Pb is an environmentally unfriendly substance and thus, in consideration of environment, the development of a lead-free semiconductor ceramic that substantially does not contain Pb has been demanded.

Patent Document 1 discloses a method for producing a $BaTiO_3$-based semiconductor ceramic, the method including adding at least one of Nb, Ta, and a rare-earth element to a structure of $Ba_{1-2x}(BiNa)_xTiO_3$ (where $0 < x \leq 0.15$) obtained by replacing part of Ba of $BaTiO_3$ with Bi—Na, sintering the structure in a nitrogen atmosphere, and performing a heat treatment in an oxidizing atmosphere.

In Patent Document 1, there is provided a lead-free $BaTiO_3$-based semiconductor ceramic having a high Curie temperature Tc of 140 to 255° C. and a temperature coefficient of resistance of 16 to 20%/° C.

Patent Document 2 discloses a semiconductor ceramic composition whose composition formula is represented by $[(A1_{0.5}A2_{0.5})_x(Ba_{1-y}Q_y)_{1-x}]TiO_3$ (where A1 is at least one of Na, K, and Li, A2 is Bi, and Q is at least one of La, Dy, Eu, and Gd), wherein the x and y satisfy $0 < x \leq 0.2$ and $0.002 \leq y \leq 0.01$.

Also in Patent Document 2, there is provided a lead-free semiconductor ceramic composition having a Curie temperature Tc of 130° C. or more.

Patent Document 1—Japanese Unexamined Patent Application Publication No. 56-169301
Patent Document 2—Japanese Unexamined Patent Application Publication No. 2005-255493

Problems to be Solved by the Invention

In Patent Documents 1 and 2, part of Ba is replaced with an alkali metal element in order to increase the Curie temperature Tc.

In the case of a PTC thermistor for a heater, the temperature is preferably caused to converge to a certain temperature within a short time after the application of a voltage. To achieve this, preferably, a temperature coefficient of resistance during rising (hereinafter referred to as "rise coefficient") is high and the rising slope is steep.

Normally, a semiconductor ceramic is produced through a step of weighing raw materials, a mixing and grinding step performed by a wet method, a drying step, a calcination step, a molding step, a firing step, and the like.

However, when mixing and grinding are performed by a wet method using pure water as a solvent, an alkali metal element in a mixed powder is dissolved in the water, and the mixed powder is gradually dried in the subsequent drying step. Therefore, the alkali metal element dissolves in the water during the drying step and, after the drying step, particles of the alkali metal element easily form an aggregate and thus are not easily dispersed in a uniform manner. A sintered body obtained after a calcination step and firing step are performed while the dispersibility is decreased may include a portion having an alkali metal element at high concentration and a portion having an alkali metal element at low concentration formed therein.

Under such circumstances, the composition in the sintered body is not uniform and a variation in composition is present. Such a variation in composition provides different Curie temperatures Tc in regions inside the sintered body. For example, Curie temperature Tc may be increased in a region including an alkali metal at high concentration, and Curie temperature Tc may be decreased in a region including an alkali metal at low concentration.

In view of the foregoing, an object of the present invention is to provide a semiconductor ceramic having satisfactory rise characteristics even if an alkali metal element is contained and a PTC thermistor that uses the semiconductor ceramic.

Means for Solving the Problems

Through the intensive study of a $(Ba,M1,Bi,Ln)_mTiO_3$-based material (M1 being an alkali metal element and Ln being a rare-earth element) having a perovskite structure (general formula $A_mBO_3$), the inventors of the present invention have found that by setting the molar ratio m between the A site and the B site within a predetermined range that achieves a slightly B-site-rich state compared with a stoichiometric composition, satisfactory rise characteristics can be achieved.

The present invention is based on the finding described above. The semiconductor ceramic according to the present invention is a lead-free semiconductor ceramic that substantially does not contain Pb, the semiconductor ceramic including a $Ba_mTiO_3$-based composition, as a main component, having a perovskite structure represented by general formula $A_mBO_3$, wherein part of Ba constituting an A site is replaced with at least an alkali metal element, Bi, and a rare-earth element, and the molar ratio m between the A site and a B site is $0.990 \leq m \leq 0.999$.

Herein, the phrase "substantially does not contain Pb" means that Pb is not added intentionally. Such a composition system to which Pb is not added intentionally is referred to as a lead-free system in the present invention.

Through the further intensive study, the inventors of the present invention have found that, by setting the content of Ca in the A site to 0.042 to 0.20 on a molar basis, a semiconductor ceramic having a higher rise coefficient α and a lower resistance value can be obtained.

That is, part of the Ba is preferably replaced with Ca in the semiconductor ceramic of the present invention, and the content of the Ca when the total number of moles of the elements constituting the A site is 1 mole is preferably 0.042 to 0.20 on a molar basis.

In the semiconductor ceramic of the present invention, the content of the Ca is preferably 0.125 to 0.175 on a molar basis.

In the semiconductor ceramic of the present invention, the molar ratio m preferably satisfies $0.990 \leq m \leq 0.995$.

In the semiconductor ceramic of the present invention, the content of the Ca is preferably 0.125 to 0.175 on a molar basis and the molar ratio m preferably satisfies $0.996 \leq m \leq 0.999$.

A PTC thermistor of the present invention includes a component body and a pair of outer electrodes formed on surfaces of the component body, wherein the component body is formed of the semiconductor ceramic described above.

Advantages

The semiconductor ceramic of the present invention includes a $Ba_mTiO_3$-based composition, as a main component, having a perovskite structure represented by general formula $A_mBO_3$, wherein part of Ba constituting an A site is replaced with at least an alkali metal element, Bi, and a rare-earth element, and the molar ratio m between the A site and a B site is $0.990 \leq m \leq 0.999$ (preferably $0.990 \leq m \leq 0.995$). Therefore, a semiconductor ceramic having satisfactory rise characteristics can be obtained.

Since part of the Ba is replaced with Ca and the content of the Ca when the total number of moles of the elements constituting the A site is 1 mole is 0.042 to 0.20 (preferably 0.125 to 0.175) on a molar basis, a semiconductor ceramic having satisfactory rise characteristics and a low resistance value can be obtained. In the case where the content of the Ca is 0.125 to 0.175 on a molar basis and the molar ratio m between the A site and the B site satisfies $0.996 \leq m \leq 0.999$, the resistance value can be further decreased while satisfactory rise characteristics are ensured.

The PTC thermistor of the present invention includes a component body and a pair of outer electrodes formed on surfaces of the component body, and the component body is formed of the semiconductor ceramic described above. Therefore, there can be provided a PTC thermistor having desired PTC characteristics, satisfactory rise characteristics, and also a low electrical resistivity achieved by incorporating Ca.

Specifically, a PTC thermistor having a rise coefficient α of more than 20%/° C. can be obtained. In the case where a certain amount of Ca is incorporated, a PTC thermistor having a rise coefficient α of 30%/° C. or more and an electrical resistivity of 40 Ω·cm or less can be obtained.

Figure 1:
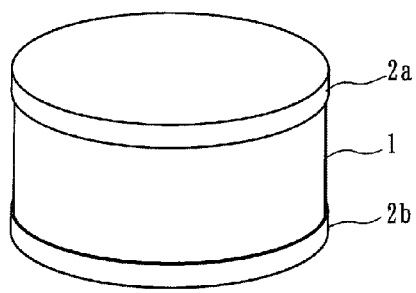
FIG. 1 is a perspective view showing an embodiment of a PTC thermistor according to the present invention.

An embodiment of the present invention will now be described.

The main component of a semiconductor ceramic according to an embodiment of the present invention has a perovskite structure represented by general formula (A).

$$(Ba_{1-w-x-z}M1_wBi_xLn_z)_mTiO_3 \quad (A)$$

M1 is an alkali metal element represented by Li, Na, and K. Ln is a rare-earth element serving as a semiconductorizing agent. The rare-earth element Ln is not particularly limited as long as it serves as a semiconductorizing agent, and at least one selected from the group of La, Y, Sm, Nd, Dy, and Gd can be preferably used.

The molar ratio m between the A site (Ba-containing site) and the B site (Ti-containing site) satisfies mathematical formula (1).

$$0.990 \leq m \leq 0.999 \quad (1)$$

By setting the molar ratio m within the range specified by the mathematical formula (1), the rise characteristics of a resistance value can be improved.

The semiconductor ceramic of this embodiment contains an alkali metal compound and a Ti compound as raw materials. Therefore, when the raw materials are mixed and a heat treatment (calcination) is performed thereon, the alkali metal element M1 and Ti react with each other and thus an M1-Ti compound is produced.

According to the analysis of a semiconductor ceramic after firing performed by the inventors of the present invention using a TEM-EDX (transmission electron microscope-energy dispersive X-ray analyzer), it was found that the amount of M1-Ti compound precipitated in grain boundaries was larger than that precipitated in crystal grains when the molar ratio m was 0.999 or less (see the Examples described below).

It is believed that when the M1-Ti compound is precipitated in grain boundaries and the concentration of Na serving as an acceptor is increased in the grain boundaries, the rise coefficient α is increased and thus the rising slope becomes steep.

As described above, the alkali metal element M1 becomes dissolved in water during the mixing and grinding step performed by a wet method, and the mixed powder is gradually dried in the subsequent drying step. Therefore, after the drying step, particles of the alkali metal element form an aggregate and thus the alkali metal element M1 is not uniformly dispersed in the mixed powder. As a result of the calcination and firing performed while the dispersibility is decreased, a portion having an alkali metal at high concentration and a portion having an alkali metal at low concentration are formed in a single semiconductor ceramic, and this is believed to be the cause of gentle rising slope.

However, the alkali metal element M1 reacts with the excessively contained Ti in a region having a high concentration of alkali metal element M1 that has formed an aggregate in the mixed powder in the B-site-rich state. Consequently, a large amount of M1-Ti compound produced is precipitated in the grain boundaries. Accordingly, it is believed that a large amount of alkali metal element M1 serving as an acceptor is segregated in the grain boundaries while the composition in the crystal grains becomes uniform, and thus the rise coefficient α is increased and the rise slope becomes steep.

For this reason, the composition in this embodiment is determined so that a B-site-rich state is achieved, that is, the molar ratio m between the A site and the B site is 0.999 or less.

If the molar ratio m is less than 0.990, the M1-Ti compound is excessively precipitated in the grain boundaries. This increases the grain boundary resistance, which increases the resistance value of the semiconductor ceramic.

Accordingly, the composition is determined so that the molar ratio m between the A site and the B site is $0.990 \leq m \leq 0.999$ and preferably $0.990 \leq m \leq 0.995$.

By setting the molar ratio m to $0.990 \leq m \leq 0.999$ as described above, satisfactory rise characteristics can be achieved. In addition, the rise characteristics can be further improved by dissolving Ca in the A site and the electrical resistivity can be decreased.

In this case, the main component of the semiconductor ceramic has a perovskite structure represented by general formula (B).

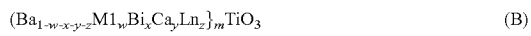

$(Ba_{1-w-x-y-z}M1_w Bi_x Ca_y Ln_z)_m TiO_3$      (B)

By replacing part of Ba with Ca, the ratio of the c crystallographic axis to the a crystallographic axis is increased and thus the tetragonal crystallinity of the crystal is improved, which increases ferroelectricity. As a result, spontaneous polarization is increased and the grain boundary barrier is eliminated. This can decrease the resistance value of the semiconductor ceramic and thus a PTC thermistor suitably used for a heater or the like can be obtained.

Normally, the crystal grain size is decreased by replacing part of Ba with Ca. However, grain growth occurs during firing and the crystal grain size is increased in the embodiment in which part of Ba is replaced with the alkali metal element M1 and Bi. Therefore, the number of grain boundaries per unit thickness is decreased, which can also decrease the resistance value.

Furthermore, the addition of Ca produces another effect of improving the rise coefficient α, in addition to the decrease in resistance.

The molar amount y of Ca in the A site is preferably set within the range that satisfies mathematical formula (2).

$0.042 \leq y \leq 0.20$      (2)

When the molar amount y of Ca in the A site is less than 0.042, the tetragonal crystallinity of the crystal cannot be sufficiently improved due to the low content of Ca and the crystal grain size is also not increased. Consequently, it is difficult to obtain a semiconductor ceramic having a desired low resistance value.

On the other hand, when the molar amount y of Ca is more than 0.20, the solid solubility limit of Ca is exceeded and Ca is precipitated in the grain boundaries, which may instead increase the resistance value.

The composition is preferably determined so that the molar amount y of Ca in the A site is 0.042 to 0.20. To further decrease the resistance value and improve the rise coefficient, the molar amount y is more preferably 0.125 to 0.175.

When the molar amount y of Ca is 0.125 to 0.175 and the molar ratio m between the A site and the B site satisfies $0.996 \leq m \leq 0.999$, satisfactory rise characteristics can be achieved and the resistance value can be further decreased.

In this embodiment, the composition is determined so that the molar ratio m between the A site and the B site and the molar amount y of Ca in the A site satisfy the mathematical formulas (1) and (2), respectively, whereby satisfactory rise characteristics can be achieved and the resistance value can be decreased.

Regarding the molar amount w of Na and the molar amount x of Bi in the A site, the total molar amount (w+x) is preferably 0.02 to 0.20. The reason is as follows. If the total molar amount (w+x) is less than 0.02, the Curie temperature Tc tends to be decreased. If the total molar amount (w+x) is more than 0.20, the composition is easily shifted from a theoretical composition of a sintered body because Na and Bi are easily volatilized. Individually, each of w and x are present in a positive molar amount which is less than 0.20.

The molar amount z of rare-earth element Ln in the A site is preferably 0.0005 to 0.015. If the molar amount z of rare-earth element Ln serving as a semiconductorizing agent is less than 0.0005 or more than 0.015, it may be difficult to achieve the semiconductorization.

In the present invention, 0.0001 to 0.0020 parts by mole of Mn is preferably added relative to 1 part by mole of main component represented by the general formula (A) or (B) to improve PTC characteristics.

In this case, the semiconductor ceramic is represented by general formula (C) or (D).

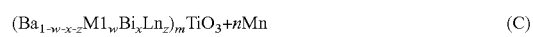

$(Ba_{1-w-x-z}M1_w Bi_x Ln_z)_m TiO_3 + nMn$      (C)

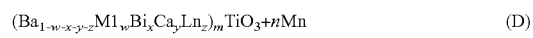

$(Ba_{1-w-x-y-z}M1_w Bi_x Ca_y Ln_z)_m TiO_3 + nMn$      (D)

where n satisfies $0.0001 \leq n \leq 0.0020$.

Mn functions as an acceptor. Therefore, an acceptor level is formed in the grain boundaries by adding Mn within the range described above and thus the number of PTC digits can be increased. As a result, the PTC characteristics can be further improved. The form in which the Mn added is not particularly limited, and any manganese compound such as sol or powder of manganese oxide or an aqueous manganese nitrate solution can be used.

A PTC thermistor that uses the above-described semiconductor ceramic will now be specifically described.

FIG. 1 is a perspective view schematically showing an embodiment of the PTC thermistor.

The PTC thermistor includes a component body 1 formed of the above-described semiconductor ceramic and a pair of outer electrodes 2a and 2b formed on both ends (surfaces) of the component body 1. The outer electrodes 2a and 2b have a single-layer structure or a multi-layer structure and are composed of a conductive material such as Cu, Ni, Al, Cr, a Ni—Cr alloy, or a Ni—Cu alloy.

In this embodiment, the external appearance has a columnar shape, but may have a disc-like shape or a rectangular parallelepiped shape.

A method for producing the PTC thermistor will now be described.

First, a Ba compound, an M1 compound containing an alkali metal element M1, a Bi compound, and a Ln compound containing a predetermined rare-earth element Ln and optionally a Ca compound are prepared as raw materials. The raw materials are weighed and mixed to obtain a mixed powder so that the semiconductor ceramic has a predetermined composition.

Subsequently, pure water serving as a solvent and a polymer-based dispersant are added to the mixed powder and thoroughly mixed and ground by a wet method in a ball mill using grinding media such as PSZ (partially stabilized zirconia) balls. The solvent is then removed by drying, and sizing is performed using a mesh having a predetermined opening. The mixture is subjected to heat treatment at 800 to 1000° C. for 2 hours to obtain a calcined powder. A vinyl acetate-based organic binder and pure water and optionally a Mn compound are added to the calcined powder and thoroughly mixed and ground using grinding media to obtain a slurry. The slurry is dried to obtain a dried product. The dried product is then sized using a mesh having a predetermined opening and compression-molded using a press such as a uniaxial press to obtain a compact.

The compact is subjected to debinding treatment at 500 to 600° C. in an air atmosphere, a nitrogen atmosphere, or a mixed stream of air and nitrogen. Subsequently, the compact is fired in a nitrogen atmosphere whose oxygen concentration is 10 to 5000 ppm by volume at a temperature that achieves semiconductorization, e.g., at a maximum firing temperature of 1250 to 1450° C. for a predetermined time to obtain a component body 1, which is a sintered body.

Outer electrodes 2a and 2b are formed on both ends of the component body 1 by plating, sputtering, electrode baking, or the like to produce a PTC thermistor.

The present invention is not limited to the above-described embodiment. For example, the semiconductor ceramic needs only to be mainly composed of $Ba_m TiO_3$ and part of Ba needs only to be replaced with predetermined amounts of alkali metal element M1, Bi, Ca, and rare-earth element Ln. Even if incidental impurities are mixed, the characteristics are not affected. For example, about 0.2 to 0.3% by weight of the PSZ balls used as grinding media when mixing and grinding are performed by a wet method may remain, but this does not affect the characteristics. Similarly, trace amounts, such as about 10 ppm by weight, of Fe, Si, and Cu may be present in the raw materials, but this does not affect the characteristics. The semiconductor ceramic of the present invention is a lead-free semiconductor ceramic. As described above, it is only required that the semiconductor ceramic substantially does not contain Pb, and Pb incidentally mixed in a concentration of about 10 ppm or less by weight is not necessarily excluded as long as it does not affect the characteristics.

Examples of the present invention will now be specifically described.

In Example 1, various samples obtained by changing only the molar ratio m were prepared without adding Ca, and the characteristics were evaluated.

$BaCO_3$, $Na_2CO_3$, $Bi_2O_3$, $TiO_2$ and $Y_2O_3$, which were raw materials of a main component, were prepared and then weighed and mixed to obtain a mixed powder so that the sintered body had the composition shown in Table 1.

Subsequently, pure water (solvent) and a polyacrylic acid-based polymer dispersant were added to the mixed powder and mixed and ground in a ball mill using PSZ balls for 24 hours. The ground composition was dried and sizing was performed using a mesh having an opening of 300 μm. The mixture was subjected to a heat treatment at 800 to 1000° C. for 2 hours to obtain a calcined powder.

A vinyl acetate-based organic binder and an aqueous manganese nitrate solution were added to the calcined powder and mixed and ground by a wet method in a ball mill using PSZ balls for 16 hours to obtain a slurry. The amount of the aqueous manganese nitrate solution added was adjusted to be 0.00025 parts by mole on a Mn basis relative to 1 part by mole of main component.

The slurry was dried and sized using a mesh having an opening of 300 μm to obtain a raw material powder.

The raw material powder was compression-molded using a uniaxial press at a pressure of $9.8 \times 10^7$ Pa (1000 kgf/cm$^2$) to obtain a disc-shaped compact having a diameter of 14 mm and a thickness of 2.5 mm.

The disc-shaped compact was subjected to debinding treatment in the air at 600° C. for 2 hours. The compact was fired in a nitrogen atmosphere whose oxygen concentration was 100 ppm by volume at a maximum firing temperature of 1400° C. for 2 hours to obtain semiconductor ceramics with a sample number of 1 to 8.

Subsequently, the semiconductor ceramics were lapped and then subjected to dry plating to form outer electrodes having a three-layer structure of NiCr/NiCu/Ag. Consequently, sample Nos. 1 to 8 were prepared.

The electrical resistivity $\rho_0$ at 25° C. (room temperature), the rise coefficient α, and the Curie temperature Tc of sample Nos. 1 to 8 were determined.

The electrical resistivity $\rho_0$ was measured by a direct current four-terminal method through the application of a voltage of 1V at 25° C.

The rise coefficient α indicates the performance of a PTC thermistor, and was determined from mathematical formula (3) in this embodiment.

$$\alpha = 230 \times \log(\rho_{100}/\rho_{10})/(T_{100}-T_{10}) \quad (3)$$

Herein, $\rho_{100}$ and $\rho_{10}$ respectively represent electrical resistivities that are 100 times and 10 times the electrical resistivity $\rho_0$ measured at 25° C. $T_{100}$ and $T_{10}$ are respectively temperatures at $\rho_{100}$ and $\rho_{10}$.

Therefore, the characteristics (hereinafter referred to as "ρ-T characteristics") between temperature T and electrical resistivity ρ were measured, and the rise coefficient α was determined from the ρ-T characteristics.

The Curie temperature Tc was defined as a temperature at which the electrical resistivity $\rho_o$ at 25° C. was doubled, and determined from the ρ-T characteristics.

Table 1 shows the compositions and measurement results of the sample Nos. 1 to 8.

Samples having an electrical resistivity $\rho_0$ of 100 Ω·cm or less and a rise coefficient α of 20%/° C. or more were judged as good.

TABLE 1

| | Composition formula: $(Ba_{0.808}Na_{0.05}Bi_{0.05}Y_{0.002})_m TiO_3 + 0.00025Mn$ | | |
|---|---|---|---|
| Sample No. | m | Electrical resistivity $\rho_0$ (Ω·cm) | Rise coefficient α (%/° C.) | Curie temperature Tc (° C.) |
| 1* | 0.985 | not semiconductorized | — | — |
| 2 | 0.990 | 96 | 29.6 | 173 |
| 3 | 0.992 | 73 | 28.5 | 175 |
| 4 | 0.994 | 43 | 27.8 | 177 |
| 5 | 0.996 | 42 | 25.4 | 177 |
| 6 | 0.999 | 33 | 21.3 | 180 |
| 7* | 1.000 | 30 | 14.3 | 183 |
| 8* | 1.005 | 32 | 12.1 | 189 |

*Outside the scope of the present invention

As is clear from Table 1, sample No. 1 could not be semiconductorized even after the firing at a maximum firing temperature of 1400° C. This may be because a Na—Ti compound was excessively precipitated in the grain boundaries and the grain boundary resistance was increased since the molar ratio m was 0.985, which was an excessively B-site-rich state, resulting in a semiconductor ceramic having a high resistance value.

Sample No. 7 had a low rise coefficient α of 14.3%/° C. This may be because the molar ratio m was 1.000, which was a stoichiometric ratio, and the dispersibility of Na, which was the alkali metal element M1, was poor and thus a local variation in composition was caused in the sintered body.

The rise coefficient α of sample No. 8 was further decreased to 12.1%/° C. This may be because the molar ratio m was 1.005, which was an A-site-rich state, and the dispersibility of Na became poorer and thus a variation in composition was further facilitated in the sintered body.

In contrast, the molar ratio m was 0.990 to 0.999 in sample Nos. 2 to 6, which were properly B-site-rich states, and the dispersibility of Na was satisfactory. Thus, the uniformity of the composition after sintering was improved and the rise coefficient α was 21.3 to 29.6%/° C., i.e., values of 20%/° C. or more.

In Example 2, various samples containing Ca were prepared and the effects achieved by the addition of Ca were confirmed.

First, $BaCO_3$, $CaCO_3$, $Na_2CO_3$, $K_2CO_3$, $Bi_2O_3$, $TiO_2$ and $Y_2O_3$, which were raw materials of a main component, were prepared and then weighed and mixed to obtain a mixed powder so that the sintered body had the composition shown in Table 2.

After that, sample Nos. 11 to 25 were prepared by the same method and process as those in Example 1.

The electrical resistivity $\rho_o$ at 25° C. (room temperature), the rise coefficient α, and the Curie temperature Tc of sample Nos. 11 to 25 were determined by the same method and process as those in Example 1.

Table 2 shows the compositions and measurement results of the sample Nos. 11 to 25.

Samples having a rise coefficient α of 20%/° C. or more were judged as good, and samples having a rise coefficient α of 30%/° C. or more and an electrical resistivity $\rho_0$ of 40 Ω·cm or less were judged as excellent.

TABLE 2

Composition formula:
$(Ba_{1-w-x-y-z}M1_wBi_xCa_yY_z)_{0.995}TiO_3 + 0.00025Mn$

| Sample No. | M1 | w | x | y | z | Electrical resistivity $\rho_0$ (Ω·cm) | Rise coefficient α (%/° C.) | Curie temperature Tc (° C.) |
|---|---|---|---|---|---|---|---|---|
| 11** | Na | 0.05 | 0.05 | 0 | 0.002 | 44 | 23.1 | 180 |
| 12 | Na | 0.05 | 0.05 | 0.042 | 0.002 | 37 | 30.2 | 170 |
| 13 | Na | 0.05 | 0.05 | 0.05 | 0.002 | 33 | 31.2 | 168 |
| 14 | Na | 0.05 | 0.05 | 0.10 | 0.002 | 31 | 32.1 | 160 |
| 15 | Na | 0.05 | 0.05 | 0.125 | 0.002 | 22 | 35.2 | 157 |
| 16 | Na | 0.05 | 0.05 | 0.15 | 0.002 | 13 | 35.6 | 152 |
| 17 | Na | 0.051 | 0.049 | 0.15 | 0.002 | 16 | 36.9 | 148 |
| 18 | Na | 0.10 | 0.10 | 0.15 | 0.002 | 28 | 36.2 | 180 |
| 19 | Na | 0.01 | 0.01 | 0.15 | 0.002 | 12 | 35.1 | 140 |
| 20 | Na | 0.05 | 0.05 | 0.15 | 0.0005 | 27 | 35.4 | 153 |
| 21 | Na | 0.05 | 0.05 | 0.15 | 0.015 | 29 | 36.1 | 152 |
| 22 | Na | 0.05 | 0.05 | 0.175 | 0.002 | 21 | 35.4 | 153 |
| 23 | Na | 0.05 | 0.05 | 0.20 | 0.002 | 31 | 30.6 | 150 |
| 24** | Na | 0.05 | 0.05 | 0.25 | 0.002 | 73 | 24.5 | 145 |
| 25 | K | 0.05 | 0.05 | 0.15 | 0.002 | 28 | 36.3 | 169 |

**Outside the preferred scope of the present invention

As is clear from Table 2, each of the sample Nos. 11 to 25 had a molar ratio m of 0.995, which was within the scope of the present invention, the rise coefficient α was a satisfactory value of 20%/° C. or more, specifically 23.1 to 36.9%/° C.

In the sample No. 11 that did not contain Ca and sample No. 24 that excessively contained Ca, the rise coefficient α was about 20%/° C. On the other hand, the rise coefficient α was as high as 30%/° C. or more in sample Nos. 12 to 23 and 25 in which the molar amount y of Ca in the A site was 0.042 to 0.20.

Similarly, the electrical resistivity $\rho_0$ was more than 40 Ω·cm in sample No. 11 that did not contain Ca and sample No. 24 that excessively contained Ca. On the other hand, sample Nos. 12 to 23 and 25 in which the molar amount y of Ca was 0.042 to 0.20, had an electrical resistivity $\rho_0$ decreased to 40 Ω·cm or less.

In the sample Nos. 15 to 22, the molar amount y of Ca in the A site was 0.125 to 0.175. The electrical resistivity $\rho_0$ was more favorably decreased to 30 Ω·cm or less.

As is clear from the sample No. 25, the results of the rise coefficient α and electrical resistivity $\rho_0$ were also satisfactory when K was used instead of Na. That is, it was found that a desired object could be achieved even if an alkali metal element other than Na was added.

Subsequently, a composition analysis was performed on the sample No. 11 using a TEM-EDX to measure the ratios Na/Ti in the crystal grains and in the grain boundaries.

Figure 2:
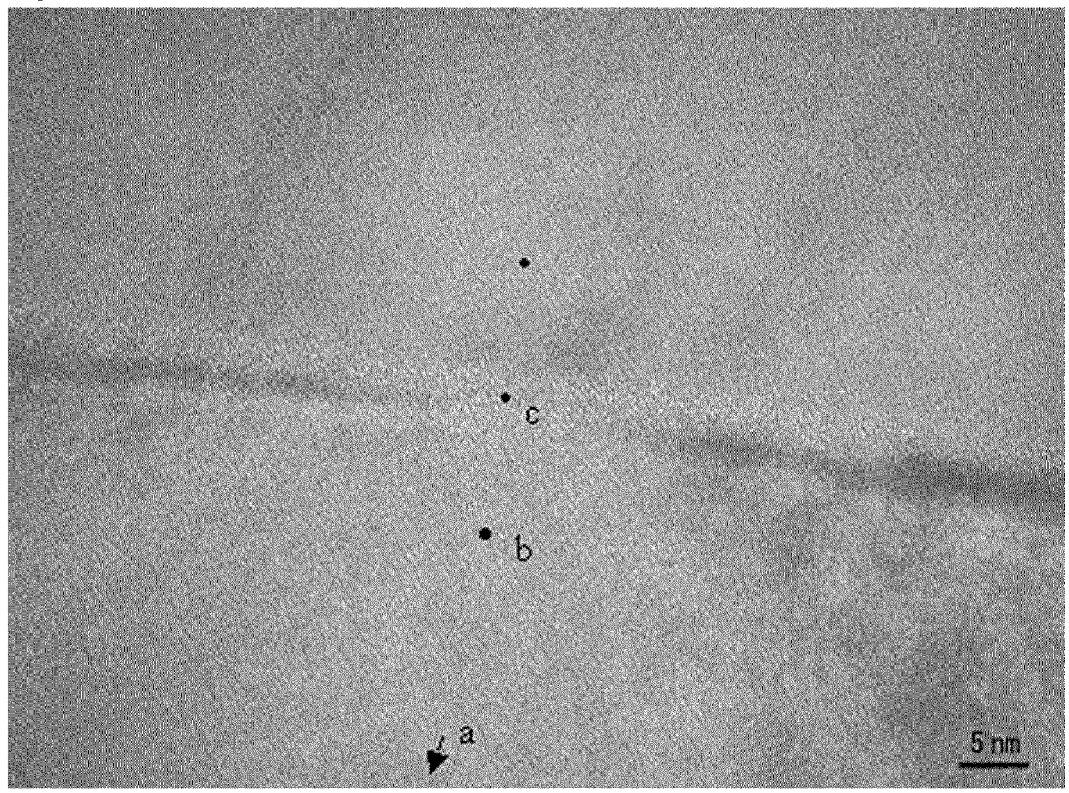
FIG. 2 is a TEM image of a sample No. 11.

FIG. 2 is a TEM image.

Points a and b are measurement points in the crystal grains and point c is a measurement point in the grain boundaries. The ratios Na/Ti were 0.0586 at the point a, 0.0705 at the point b, and 0.0962 at the point c. In other words, it was confirmed that excessively added Ti reacted with Na and the resultant Na—Ti compound was present in the grain boundaries in a large amount.

In Example 3, various samples obtained by changing m and y were prepared, and the characteristics were evaluated.

$BaCO_3$, $CaCO_3$, $Na_2CO_3$, $Bi_2O_3$, $TiO_2$ and $Y_2O_3$, which were raw materials of a main component, were prepared and then weighed and mixed to obtain a mixed powder so that the sintered body had the composition shown in Table 3.

After that, sample Nos. 31 to 46 were prepared by the same method and process as those in Example 1.

The electrical resistivity $\rho_o$ at 25° C. (room temperature), the rise coefficient α, and the Curie temperature Tc of sample Nos. 31 to 46 were determined by the same method and process as those in Example 1.

Table 3 shows the compositions and measurement results of the sample Nos. 31 to 46.

TABLE 3

Composition formula:
$(Ba_{0.898-y}Na_{0.05}Bi_{0.05}Ca_yY_{0.002})_mTiO_3 + 0.00025Mn$

| Sample No. | m | y | Electrical resistivity $\rho_0$ (Ω·cm) | Rise coefficient α (%/° C.) | Curie temperature Tc (° C.) |
|---|---|---|---|---|---|
| 31* | 0.985 | 0.15 | not semiconductorized | — | — |
| 32 | 0.990 | 0.125 | 28 | 35.6 | 152 |
| 33 | 0.990 | 0.15 | 25 | 37.2 | 149 |
| 34 | 0.990 | 0.175 | 27 | 37.4 | 148 |
| 35 | 0.992 | 0.15 | 13 | 36.5 | 153 |

TABLE 3-continued

Composition formula:
$(Ba_{0.898-y}Na_{0.05}Bi_{0.05}Ca_yY_{0.002})_mTiO_3 + 0.00025Mn$

| Sample No. | m | y | Electrical resistivity $\rho_0$ (Ω·cm) | Rise coefficient α (%/°C.) | Curie temperature Tc (°C.) |
|---|---|---|---|---|---|
| 36 | 0.994 | 0.15 | 11 | 35.3 | 155 |
| 37 | 0.995 | 0.15 | 13 | 35.6 | 152 |
| 38 | 0.996 | 0.15 | 8 | 31.5 | 156 |
| 39 | 0.998 | 0.1 | 11 | 30.3 | 162 |
| 40 | 0.998 | 0.125 | 8 | 30.4 | 159 |
| 41 | 0.998 | 0.15 | 7 | 30.7 | 157 |
| 42 | 0.998 | 0.175 | 9 | 30.8 | 154 |
| 43 | 0.998 | 0.2 | 13 | 30.2 | 151 |
| 44 | 0.999 | 0.15 | 9 | 30.3 | 157 |
| 45* | 1.000 | 0.15 | 8 | 18.5 | 158 |
| 46* | 1.005 | 0.15 | 10 | 14.4 | 161 |

*Outside the scope of the present invention

As is clear from Table 3, substantially the same results as in Example 2 were obtained in the samples containing Ca and having different molar ratios m.

In sample No. 31, the molar ratio m was 0.985, which was an excessively B-site-rich state. The content of Y serving as a semiconductorizing agent was relatively decreased and the semiconductorization could not be achieved even though firing was performed at a maximum firing temperature of 1400° C.

In sample No. 45, the molar ratio m was 1.000, which was a stoichiometric ratio. The dispersibility of Na, which was the alkali metal element, was poor and thus a local variation in composition was present in the sintered body. Consequently, the rise coefficient α was as low as 18.5%/° C.

In sample No. 46, since the molar ratio m was 1.005, which was an A-site-rich state. The dispersibility of Na became poorer and thus a local variation in composition was further facilitated in the sintered body. Consequently, the rise coefficient α was further decreased to 14.4%/° C.

In contrast, the molar ratio m was 0.990 to 0.999, which were properly B-site-rich states, in sample Nos. 32 to 44, and the dispersibility of Na was satisfactory. Thus, the uniformity of the composition after sintering was improved and the rise coefficient α was 30.3 to 37.4%/° C., i.e., a value of 20%/° C. or more. In addition, since the molar amount y of Ca in the A site was 0.125 to 0.175, the electrical resistivity $\rho_o$ could be decreased to 30 Ω·cm or less.

It was found that when the molar ratio m was 0.990 to 0.995 and the molar amount y of Ca in the A site was 0.125 to 0.175, the rise coefficient was more favorably 35%/° C. or more.

The following was also found. When the molar ratio m was 0.996 to 0.999 and the molar amount y of Ca in the A site was 0.125 to 0.175, the rise coefficient α was as high as 30.3%/° C. and the electrical resistivity was less than 10 Ω·cm. These semiconductor ceramics are effectively used when a low electrical resistivity is required.

1 component body
2a, 2b outer electrode

The invention claimed is:

1. A lead-free semiconductor ceramic that substantially does not contain Pb, the semiconductor ceramic comprising:
a barium titanate composition, as a main component, having a perovskite structure represented by general formula $A_mBO_3$,
wherein the A site comprises Ba, Na or K or both, Bi, and a rare-earth element, and
the molar ratio m between the A site and a B site satisfies $0.990 \leq m \leq 0.999$.

2. The semiconductor ceramic according to claim 1, wherein the A site further contains Ca, and the content of the Ca when the total number of moles of the elements constituting the A site is 1 mole is 0.042 to 0.20 on a molar basis.

3. The semiconductor ceramic according to claim 2, wherein the content of the Ca is 0.125 to 0.175 on a molar basis.

4. The semiconductor ceramic according to claim 3, wherein the molar ratio m satisfies $0.990 \leq m \leq 0.995$.

5. The semiconductor ceramic according to claim 3, wherein the molar ratio m between the A site and the B site satisfies $0.996 \leq m \leq 0.999$.

6. The semiconductor ceramic according to claim 2, wherein the molar ratio m satisfies $0.990 \leq m \leq 0.995$.

7. The semiconductor ceramic according to claim 2, wherein the molar ratio m between the A site and the B site satisfies $0.996 \leq m \leq 0.999$.

8. The semiconductor ceramic according to claim 1, wherein the molar ratio m satisfies $0.990 \leq m \leq 0.995$.

9. The semiconductor ceramic according to claim 1, wherein the molar ratio m between the A site and the B site satisfies $0.996 \leq m \leq 0.999$.

10. A semiconductor ceramic having the compositional formula

$(Ba_{1-w-x-y-z}M1_wBi_xCa_yLn_z)_mTiO_3+nMn$ in which M1 is Na or K or both, Ln is a rare earth metal, $0.02 \leq (w+x) \leq 0.20$, y is 0 or in the range of 0.42 to 0.20, $0.0005 \leq z \leq 0.015$, $0.990 \leq m \leq 0.995$, and $0.0001 \leq n \leq 0.0020$.

11. A positive temperature coefficient thermistor comprising a component body and a pair of outer electrodes formed on surfaces of the component body, wherein the component body comprises the semiconductor ceramic according to claim 10.

12. A positive temperature coefficient thermistor comprising a component body and a pair of outer electrodes formed on surfaces of the component body, wherein the component body comprises the semiconductor ceramic according to claim 9.

13. A positive temperature coefficient thermistor comprising a component body and a pair of outer electrodes formed on surfaces of the component body, wherein the component body comprises the semiconductor ceramic according to claim 8.

14. A positive temperature coefficient thermistor comprising a component body and a pair of outer electrodes formed on surfaces of the component body, wherein the component body comprises the semiconductor ceramic according to claim 7.

15. A positive temperature coefficient thermistor comprising a component body and a pair of outer electrodes formed on surfaces of the component body, wherein the component body comprises the semiconductor ceramic according to claim 6.

16. A positive temperature coefficient thermistor comprising a component body and a pair of outer electrodes formed on surfaces of the component body, wherein the component body comprises the semiconductor ceramic according to claim 5.

17. A positive temperature coefficient thermistor comprising a component body and a pair of outer electrodes formed on surfaces of the component body, wherein the component body comprises the semiconductor ceramic according to claim 4.

18. A positive temperature coefficient thermistor comprising a component body and a pair of outer electrodes formed on surfaces of the component body, wherein the component body comprises the semiconductor ceramic according to claim 3.

19. A positive temperature coefficient thermistor comprising a component body and a pair of outer electrodes formed on surfaces of the component body, wherein the component body comprises the semiconductor ceramic according to claim 2.

20. A positive temperature coefficient thermistor comprising a component body and a pair of outer electrodes formed on surfaces of the component body, wherein the component body comprises the semiconductor ceramic according to claim 1.

* * * * *